United States Patent
Nakamura (10) Patent No.: US 6,825,954 B1
(45) Date of Patent: Nov. 30, 2004

(54) INFORMATION COMMUNICATION APPARATUS

(75) Inventor: Takeshi Nakamura, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/523,089

(22) Filed: Mar. 10, 2000

(30) Foreign Application Priority Data

Mar. 12, 1999 (JP) .......................................... P11-065714

(51) Int. Cl.$^7$ ............................................. H04N 1/100
(52) U.S. Cl. ....................... 358/400; 358/404; 358/405; 358/1.15
(58) Field of Search ................................. 358/400, 404, 358/405, 407, 437, 468, 1.15, 1.16, 1.14, 411

(56) References Cited

U.S. PATENT DOCUMENTS

| | | | | |
|---|---|---|---|---|
| 5,270,830 A | * | 12/1993 | Suzuki | 358/400 |
| 5,280,366 A | * | 1/1994 | Araki | 358/453 |
| 5,535,277 A | * | 7/1996 | Shibata et al. | 380/28 |
| 6,064,915 A | * | 5/2000 | Kaneko et al. | 700/9 |
| 6,130,860 A | * | 10/2000 | Suzuki | 368/10 |
| 6,137,597 A | * | 10/2000 | Kanaya | 358/402 |
| 6,160,968 A | * | 12/2000 | Noda | 399/8 |
| 6,452,688 B1 | * | 9/2002 | Suzuki | 358/1.15 |
| 6,570,667 B1 | * | 5/2003 | Hattori et al. | 358/1.15 |
| 6,763,104 B1 | * | 7/2004 | Judkins et al. | 379/265.09 |

FOREIGN PATENT DOCUMENTS

| | | |
|---|---|---|
| JP | 2-021773 | 1/1990 |
| JP | 2-280571 | 11/1990 |
| JP | 3-53656 | 3/1991 |
| JP | 4-101555 | 4/1992 |
| JP | 5-199349 | 8/1993 |
| JP | 5-276296 | 10/1993 |
| JP | 5-347694 | 12/1993 |
| JP | 6-343122 | 12/1994 |
| JP | 8-265465 | 10/1996 |
| JP | 8-307645 | 11/1996 |
| JP | 8-331302 | 12/1996 |
| JP | 9-23299 | 1/1997 |
| JP | 9-294174 | 11/1997 |
| JP | 10-65857 | 3/1998 |

* cited by examiner

Primary Examiner—Kimberly Williams
Assistant Examiner—Negussie Worku
(74) Attorney, Agent, or Firm—David G. Conlin; Peter J. Manus; Edwards & Angell LLP (57) ABSTRACT

An object of the invention is to provide an information communication apparatus that allows communication management information to be readily printed out at desired time while also achieving reductions in standby power consumption. A transmitting/receiving apparatus as the information communication apparatus includes: an operation display section; a G4/G3 communication control section; a modem; a network controller; a system memory for storing communication management information for managing a communication history, such as the start time of the communication, the number of pages communicated, and communication errors, and also storing printout time information preset to print out the communication management information; a printing section for printing out received image information and the communication management information; and a clock circuit for detecting time information concerning a time at which image information was transmitted or received and a time at which the communication management information was printed out. When a transmission/reception control section within the transmitting/receiving apparatus detects that an operation has been performed at the operation display section, the operation time detected is compared with printout time information, and if the operation time detected is later than the time corresponding to the printout time information, the communication management information is printed out via the printing section.

4 Claims, 7 Drawing Sheets

INFORMATION COMMUNICATION APPARATUS

BACKGROUND OF THE INVENTION

1. Field of the Invention

The present invention relates to an information communication apparatus exemplified by a facsimile apparatus, and more particularly to an information communication apparatus capable of printing out communication management information consisting of the date and time of information transmission or reception, the number of pages transmitted or received, transmission or reception errors, etc.

2. Description of the Related Art

In the field of information communication apparatuses exemplified by facsimile apparatuses, etc. for transmitting and receiving information, information communication apparatuses are known in the prior art in which, in order to keep track of information transmissions/receptions including the date and time thereof, the kinds of information to be outputted as communication management information are preset and the communication management information is printed out when the remaining memory capacity of storage means for storing the preset communication management information has reached a predetermined value. One such apparatus is disclosed in Japanese Examined Patent Publication JP-B2 2501775.

However, since the information items to be printed out as the communication management information is preset, and is printed out when the remaining memory capacity has reached a predetermined value, this kind of apparatus has the problem that if information is transmitted or received at irregular intervals of time, time of printout becomes unpredictable and therefore printout is not carried out with timing desired by a user, with the result that the communication management information printout function cannot be made full use of.

In view of this, Japanese Unexamined Patent Publication JP-A 2-280571 (1990) proposes an information communication apparatus which prints out communication management information at specified time so that the communication management information can be printed out at the desired time, but according to the art described in this patent publication, power is forcefully turned on to the printing section to print out the communication management information at the specified time, even when the operator is away, for example, for a holiday.

Conventional information communication apparatuses often employ a print output section, such as a laser beam printer, that requires preheating; in that case, since the printing section must be preheated before a printout can be produced, power is always turned on to the printing section so that a printout operation can start instantly when a printout request is issued. Accordingly, the prior art of JP-A 2-280571 has had the problem that standby power consumption cannot be reduced since power is always turned on to the printing section.

To solve the problem of JP-A 2-280571, Japanese Examined Patent Publication JP-B2 2678621 proposes an information communication apparatus in which power is cut off to the printing section while in standby, and the printing section is made ready for printing after preheating.

According to the art disclosed in JP-B2 2678621, since power is cut off to the printing section while in standby, and the printing section is preheated as necessary for printing, power consumption itself can be reduced compared with the normally power-on configuration.

In this case also, if the setting is made so that a printout is automatically produced upon reaching the specified time or at the time that the remaining memory capacity for the communication management information has reached a predetermined value, the printout is automatically produced even when the operator is not present during nighttime or is away for a holiday or for other reasons, and thus the above prior art also has had the problem that standby power consumption cannot be reduced.

In a configuration where the communication management information is printed out when an operation at an operation part is detected, if the setting is made so that the communication management information is printed out on a day to day basis, there is the possibility that if an operation at the operation part is detected in the nighttime, the date may have already changed at the time of the operation and, in that case also, the management information is printed out.

Furthermore, when the operator is making a plurality of copies of a document by using a copy function, for example, there is the possibility that after a certain amount of time has elapsed from the start of the operation, the time to start the printout of the communication management information may arrive during the copy operation, automatically starting the printout of the communication management information by interrupting the copy operation, thus forcing the operator to wait the copy operation until the printout of the communication management information is completed.

SUMMARY OF THE INVENTION

The invention has been devised to solve the above enumerated problems of the prior art, and an object of the invention is to provide an information communication apparatus that allows communication management information to be readily printed out at desired time while also achieving reductions in standby power consumption.

The invention concerns an information communication apparatus which outputs communication management information such as the start time, number of pages, and errors of each transmission or reception, and an object of the invention is to provide an information communication apparatus in which when it is detected that an operation part is operated or when a printout operation is completed, for example, then it is determined whether a new operation or an operation to start a printing operation has been performed within a predetermined time and, in the case where such operation has not been performed, the communication management information is allowed to be printed out.

In a first aspect of the invention, there is provided an information communication apparatus comprising operating means for operating the apparatus; communication means capable of communicating information mutually with a remote apparatus via a communication line; storage means for storing communication management information for managing a communication history as communication history information, and printout time information which is preset with respect to printout of the communication management information; printing means for printing out received information and the communication management information; and clock means for detecting time information concerning a time at which information was transmitted or received and a time at which the communication management information was printed out, wherein the communication management information is updated every time when information is transmitted/received and is allowed to be printed out via the printing means based on the printout time information, the information communication apparatus further comprising operation detecting means for detecting that an operation has been performed at the operating means; and control means for comparing, in the case where it is detected by the operation detecting means that an operation has been performed at the operating means, an operation time at which the operation at the operating means was detected by the operation detecting means with the printout time information and, in the case where the operation time is later than a time defined by the printout time information, controlling the printing means to print out the communication management information.

As described, since whether to print out the communication management information is determined at the time an operation at the operation part is detected, if no operator of the operation part is present in the nighttime or holidays, for example, the communication management information will not be printed out automatically, providing the effect of reducing the standby power consumption. Furthermore, in the case where a large amount of information has been transmitted while the operator is away, the above arrangement eliminates the operator's effort to find or sort the necessary information from among many printouts.

In a second aspect of the invention, in the configuration of the first aspect of the invention, the storage means further stores a printout prohibited period which is preset as a period during which the communication management information is prohibited from being printed out, and the control means further judges whether the operation time falls within the printout prohibited period, and in the case where the operation time is outside the printout prohibited period and is later than the time defined by the printout time information, controls the printing means to print out the communication management information.

According to the second aspect of the invention, in addition to the effect offered by the first aspect of the invention, it becomes possible to perform control so that, for example, if an operation performed at the operating means is detected at nighttime when the date has changed, the communication management information is printed out not at that time, but at a time when the operator comes to the office the next morning, that is, when the operator first operates the operating means the next morning.

In a third aspect of the invention, in the configuration of the first or second aspect of the invention, the storage means further stores a previous operation time representing a time at which the operating means was last operated and an operation interval of time which is preset with respect to allowance of printout, and the control means further controls the printing means to print out the communication management information in the case where a period of time which elapsed between the previous operation time and an operation time currently detected exceeds the operation interval of time.

Accordingly, in addition to the effect offered by the first or second aspect of the invention, the third aspect of the invention offers the effect that when the operator performs a prescribed operation such as a printing operation following the previous operation (before the operation interval of time elapses), the communication management information is not printed out, otherwise the communication management information is printed out, thus preventing interference or confusion from being caused to the operation the operator is currently performing.

In a fourth aspect of the invention, there is provided an information communication apparatus comprising communication means capable of communicating information mutually with a remote apparatus via a communication line; storage means for storing communication management information for managing a communication history as communication history information, and printout time information which is preset with respect to printout of the communication management information; printing means for printing out received information and the communication management information; and clock means for detecting time information concerning a time at which information was transmitted or received and a time at which the communication management information was printed out, the communication management information being updated every time when information is transmitted/received and being allowed to be printed out via the printing means based on the printout time information, wherein the clock means detects time information concerning a printout completion time at which the printing means has completed the printout, and the storage means stores the printout completion time based on a result of the detection from the clock means and a printout allowed interval of time which is preset as an interval of time during which the communication management information is allowed to be printed out, the information communication apparatus further comprising control means for controlling, when it is confirmed that no printing operation has been carried out during the printout allowed interval of time which has elapsed from the printout completion time, the printing means to print out the communication management information.

As described, when it is detected that no printing operation has been performed for a predetermined period of time since the end of the last printing operation of the printing section, the printing means is controlled to print out the communication management information. Accordingly, the communication management information can be prevented from being printed out by interrupting the current printing operation. Furthermore, since the printing section is already warmed up for the previous printing, the printout operation for the communication management information can be started smoothly, which provides an effect that the power consumption can be reduced, compared with the case where the printing section has to be warmed up specifically for printing the communication management information.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

Figure 1:
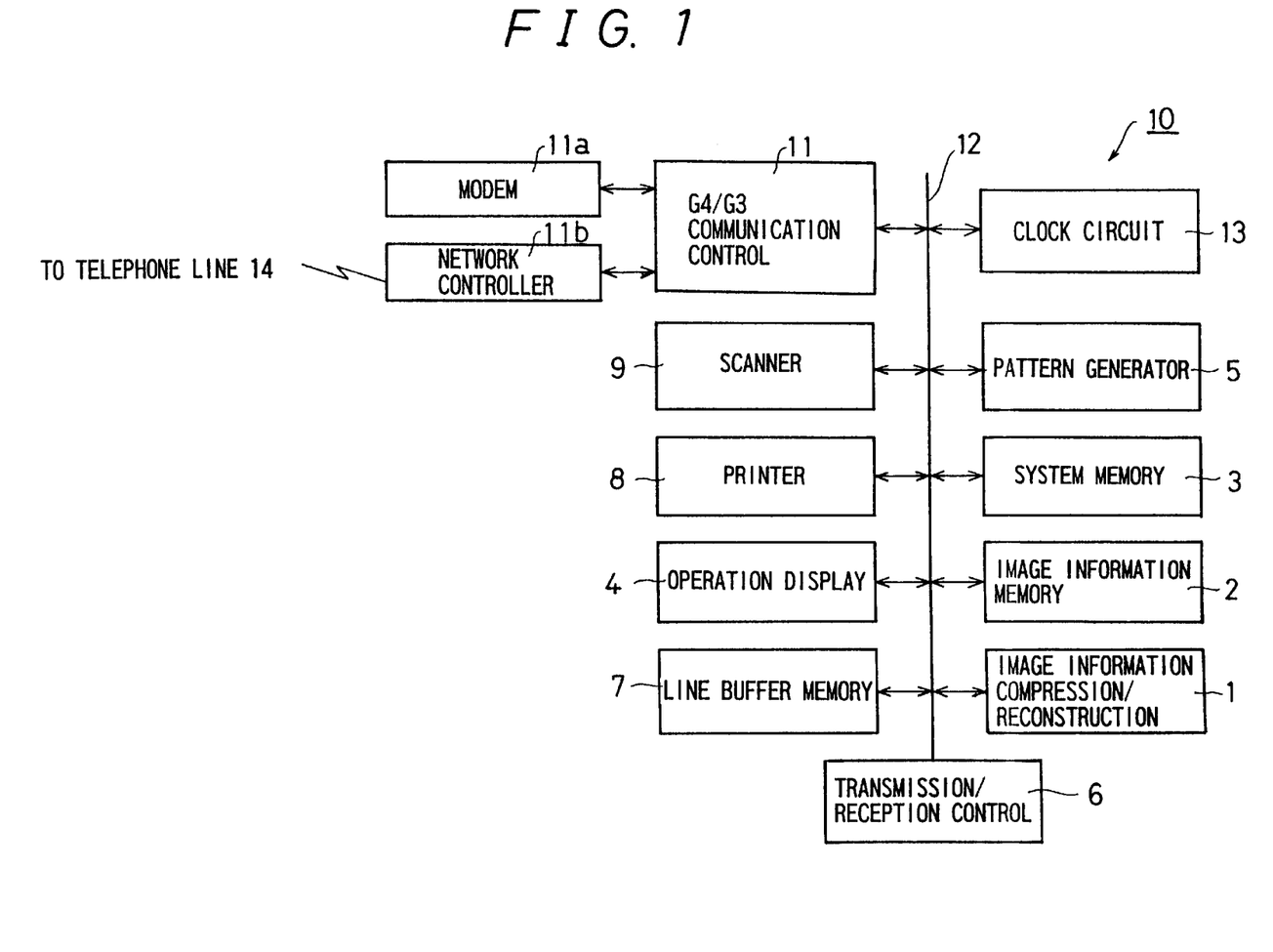
FIG. 1 is a schematic block diagram of an information communication apparatus of a first embodiment of the invention.

An information communication apparatus of a first embodiment of the invention will be described below by taking as an example a facsimile apparatus consisting of a communication means, a scanner section, a printing section, a transmission/reception control section, etc. FIG. 1 is a block diagram of the invention as applied to a transmitting/receiving apparatus (facsimile apparatus) 10 as an information communication apparatus capable of transmitting and receiving information and having a copy function.

The transmitting/receiving apparatus 10 includes: an image information compression/reconstruction section 1 for encoding and compressing transmit data for transmission, and for decoding the received encoded/compressed information to reconstruct the original data; an image information memory 2 for storing transmitted and received data; a system memory 3 as a storage means for storing registration data, communication management information, etc.; an operation display section 4 comprising a liquid crystal display and various operation keys as operating means for operating the transmitting/receiving apparatus 10; a pattern generator 5 for converting character code into a pattern; and a transmission/reception control section 6 forming a control means comprising a central processing unit (CPU) for controlling the various blocks of the apparatus, a read only memory (ROM) holding therein a program that the CPU executes, and a random access memory (RAM) for providing a work area during execution of the program. The transmission/reception control section 6 also functions as an operation detector for detecting whether an operation has been performed at the operation display section 4.

The transmitting/receiving apparatus 10 further includes: a line buffer memory 7 as a storage means for the transmission of transmit data; a printing section 8 for printing received data and communication management information for recording on a prescribed transfer member (recording paper); a scanner section 9 for reading a document for transmission or copying by scanning the document; a clock circuit 13 forming a clock means for obtaining the current time and date information; a G4/G3 communication control section 11 for controlling G4/G3 transmission/reception communications; a modem 11a for performing modulation and demodulation of image information for transmission and reception; a network controller 11b having an automatic calling and call receiving function and provided to connect the transmitting/receiving apparatus 10 to a telephone line 14; and a system bus 12 interconnecting the various constituent blocks of the apparatus for data transfer. The G4/G3 communication control section 11, the modem 11a and the network controller 11b together constitute the communication means.

On-off control to reduce the power consumption of the printing section 8 can be performed by issuing instructions from the transmission/reception control section 6, and the time can be measured using the clock circuit 13. Here, the clock means 13 may be constructed using a dedicated timer circuit or the like, or may be configured to count and measure the time using software or using the timer built in the CPU, for example. In short, any configuration may be employed as long as it allows time information to be detected by the transmission/reception control section 6, etc.

For the printing section 8, a laser printer employing electrophotography is commonly used. In the laser printer, a fusing unit (not shown) for fusing and fixing the toner transferred to the transfer member is maintained at a temperature (preheat condition) slightly lower than the temperature required for printing operation in order to enable the printing operation to be started instantly while reducing power consumption; when performing a printing operation, the temperature is raised from the preheat condition by using a heating member such as a heat roller, and the printing operation (fusing operation) is performed after entering the standby state.

Furthermore, for the printing section 8 to which the invention can be applied, not only the above-described laser printer system, but any other printing system can equally be used as long as the printer consumes a relatively large amount of power during printing and takes time to enter the standby mode and get ready for printing; for example, if the printing system uses a printer engine that uses toner for printing, the so-called direct toning method that forms an image by projecting toner directly to a transfer member, for example, may be employed as the printing method, and furthermore, if the printing system is an ink jet recording system, especially of the type that uses a heater for drying ink, or if the printing system is a thermal transfer printing system that requires a large amount of heat for printing, the invention can be equally applied to such printing systems.

The system memory 3 stores communication management information consisting of various items of information such as the start time of transmission or reception, the number of documents transmitted or received, the occurrence of a transmission or reception error and the type of the error, etc. for each transmission or reception transaction of the transmitting/receiving apparatus 10, as will be described later. The stored communication management information is printed out with prescribed timing by the printing section 8.

In the above description, the transmitting/receiving apparatus 10 has been described as if it were constructed as a single unit, but all or part of the constituent units may be constructed as separated units. For example, the modem 11a shown in FIG. 1 may be provided as an external modem, the operation display section 4 as a keyboard and a CRT (Cathode Ray Tube) or a liquid crystal display, the scanner section 9 as an external scanner, the transmission/reception control section 6 as an information processing apparatus such as a personal computer, and the printing section 8 as an external printer. Accordingly, the transmit/receive data mentioned herein may include image data already captured by the external scanner and already stored on a hard disk or the like.

Also, the above description has assumed that the information to be communicated is image information, but the invention is not limited to handling this type of information; for example, the invention can also be carried out, for example, when text data or control dada or the like is communicated as information, as long as the configuration is such that a communication log can be stored as communication management information and printed out at predetermined intervals of time.

Figure 2:
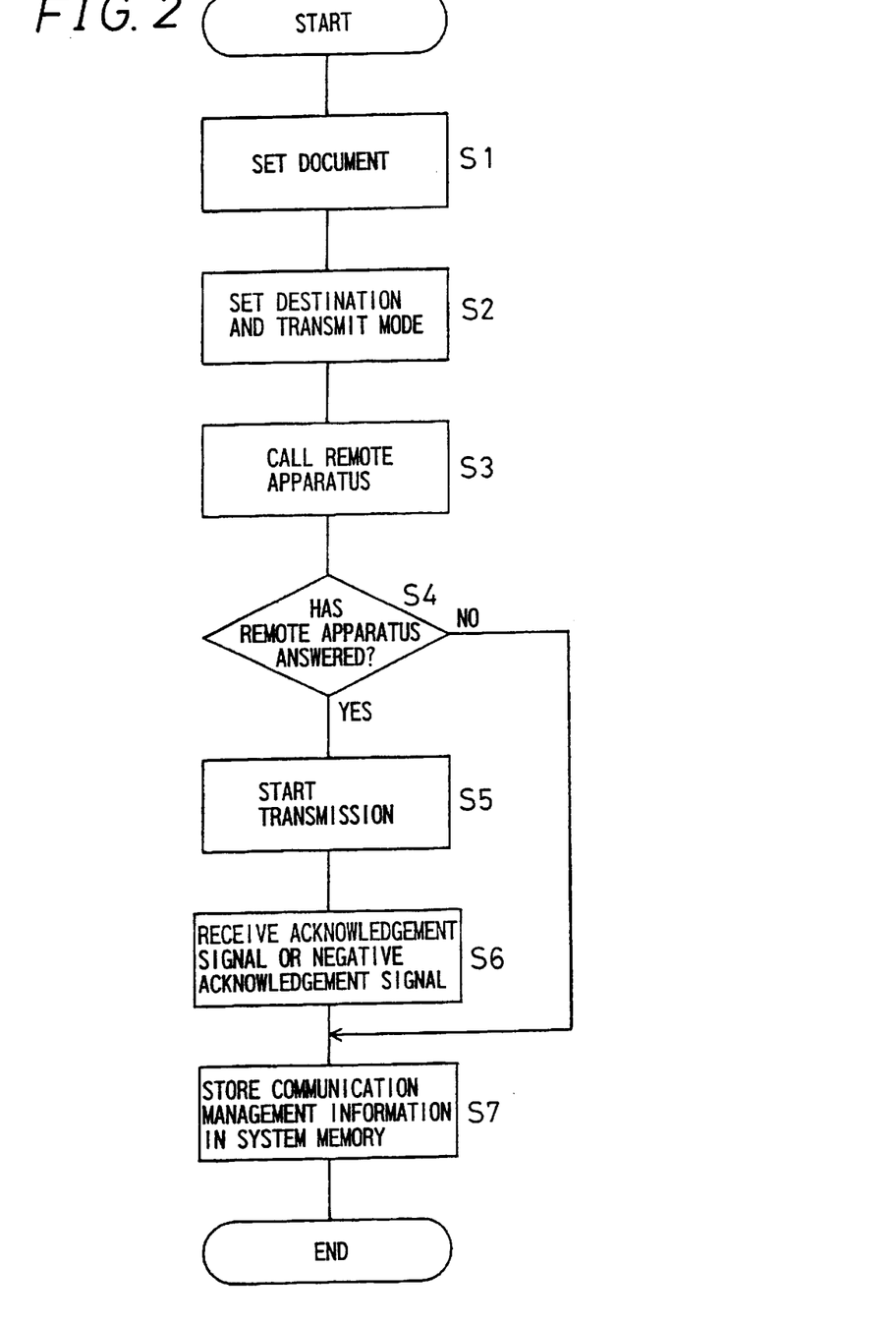
FIG. 2 is a flow chart for explaining the transmit operation of the information communication apparatus of the first embodiment of the invention.
Figure 3:
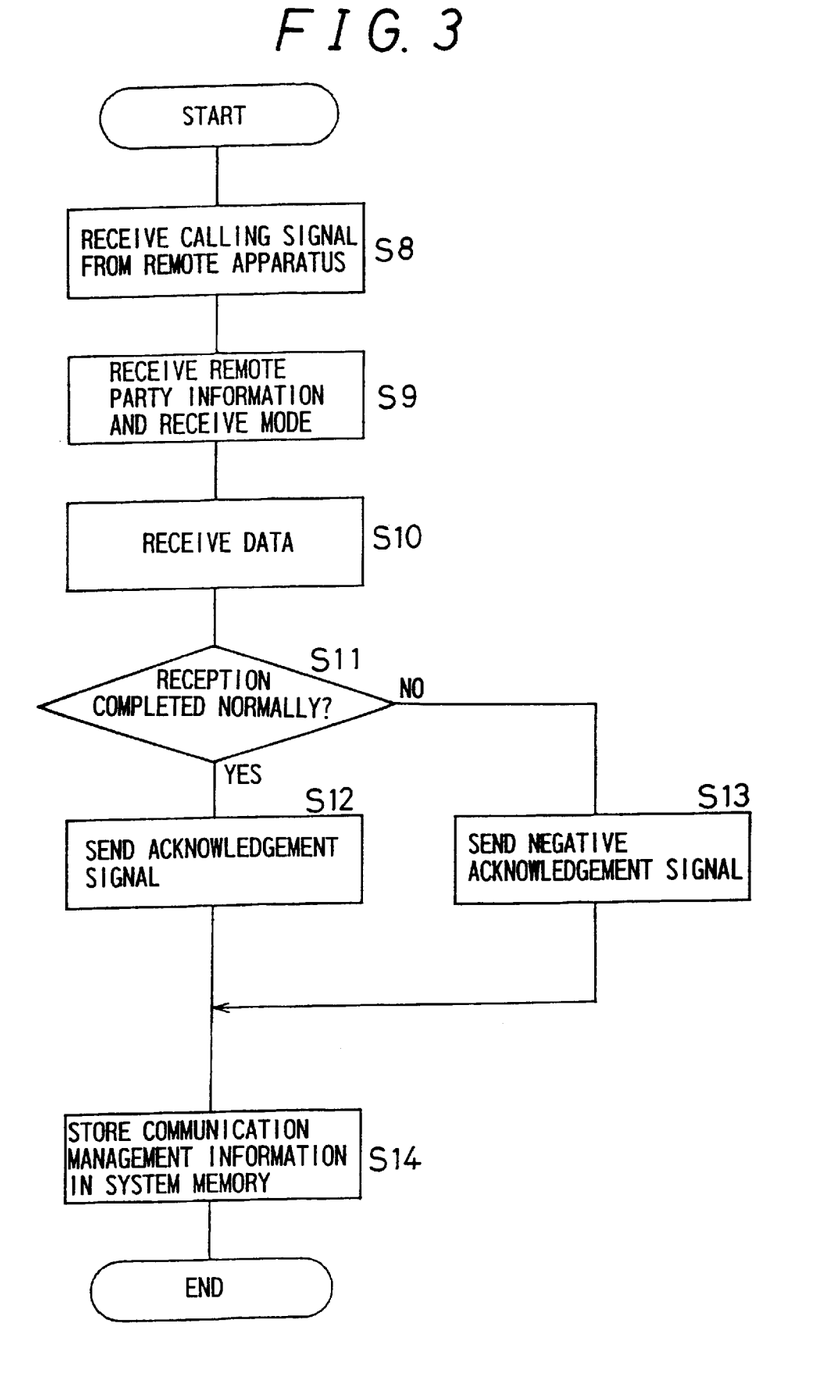
FIG. 3 is a flow chart for explaining the receiving operation of the information communication apparatus of the first embodiment of the invention.

Next, transmitting/receiving operations performed in the transmitting/receiving apparatus 10 will be described below with reference to the flow charts of FIGS. 2 and 3.

(Transmit operation)

The transmit operation here refers to the operation whereby the transmitting/receiving apparatus 10 reads a document image and transmits information corresponding to the document image to a remote transmitting/receiving apparatus via the telephone line 14. First, the document to be transmitted is placed on the scanner section 9 of the transmitting/receiving apparatus (step S1, hereinafter abbreviated as S1), and a transmit mode is set by entering or selecting various data, such as the destination for which the transmission is intended, the number of documents to be transmitted, and the document size, at the operation display section 4 (S2).

Next, using the G4/G3 control section 11, modem 11a, and network controller 11b, the apparatus is connected to the telephone line and a calling signal is transmitted, thus calling the remote apparatus entered at the operation display section 4 to establish a connection and transmit control signals (S3) Then, it is checked whether the remote transmitting/receiving apparatus answers (S4).

When the remote apparatus answers (Y in S4), the transmit operation is started to transmit the data stored in the image information memory 2 (S5). As the result of the transmit operation, the transmit data may or may not be able to be transmitted correctly; further, even if the remote apparatus is called, the remote apparatus may not respond to the call, or even when the communication is started, the communication may be interrupted because of a communication failure.

After receiving from the remote apparatus an acknowledgement signal indicating that the reception is normally completed or a negative acknowledgement signal indicating that the reception has not been completed normally (S6), the transmit operation is terminated, and information consisting of called party information (the called number, the name of the called party, the ID number of the called party, the registration number of the called party, etc.), transmission time (the start time of the transmission, the time required for communication, the end time of the transmission, etc.), transmission results of the transmitted data (indicating whether or not the communication has been completely successfully, how much of the transmitted data has been transmitted correctly, etc.), the number of documents transmitted, and the transmitted document size, etc. is stored as the communication management information in the system memory 3 (S7).

When transmitting the document information, the document image information may be transmitted each time a predetermined amount of document image information is read by the scanner section 9 (for example, for each document page) while continuing to read the document image by the scanner section 9, or may be transmitted at once after the image information of all document pages to be transmitted has been scanned and stored into the image information memory 2 (the so-called memory transmission)

(Receive operation)

The receiving operation here refers to the operation whereby the transmitting/receiving apparatus 10 receives information corresponding to the document image read at a remote transmitting/receiving apparatus and transmitted via the telephone line 14 connected thereto.

First, when a calling signal sent out from the remote transmitting/receiving apparatus is received by the network controller 11b via the telephone line 14 (S8), the connection of the telephone line 14 is established and, after that, remote party information, such as remote party identification information, and information related to receive mode, such as the number of documents and the document size, are received from the remote transmitting/receiving apparatus (S9).

After receiving the information related to the receive mode, document image information (received data) is received (S10), and the received data is checked to verity whether the data has been received correctly (S11). If the reception has been completed normally (Y in Sl1), an acknowledgement signal is sent to the remote apparatus (S12); on the other hand, if the reception has not been completed normally (N in S11), a negative acknowledgement signal is sent to the remote apparatus (S13).

After that, information consisting of calling party information (the calling party number, the name of the calling party, the ID number of the calling party, the registration number of the calling party, etc.), reception time (the start time of the reception, the time required for communication, the end time of the reception, etc.), reception results of the received data (indicating whether or not the communication has been completely successfully, how much of the transmitted data has been transmitted correctly, etc.), the number of documents received, the received document size, etc. is stored as the communication management information in the system memory 3 (S14).

When receiving the document information, the received data may be printed out by the printing section 8 as the data is received, or may be printed out at once after all the received data has been stored into the image information memory 2 or the like.

Figure 4:
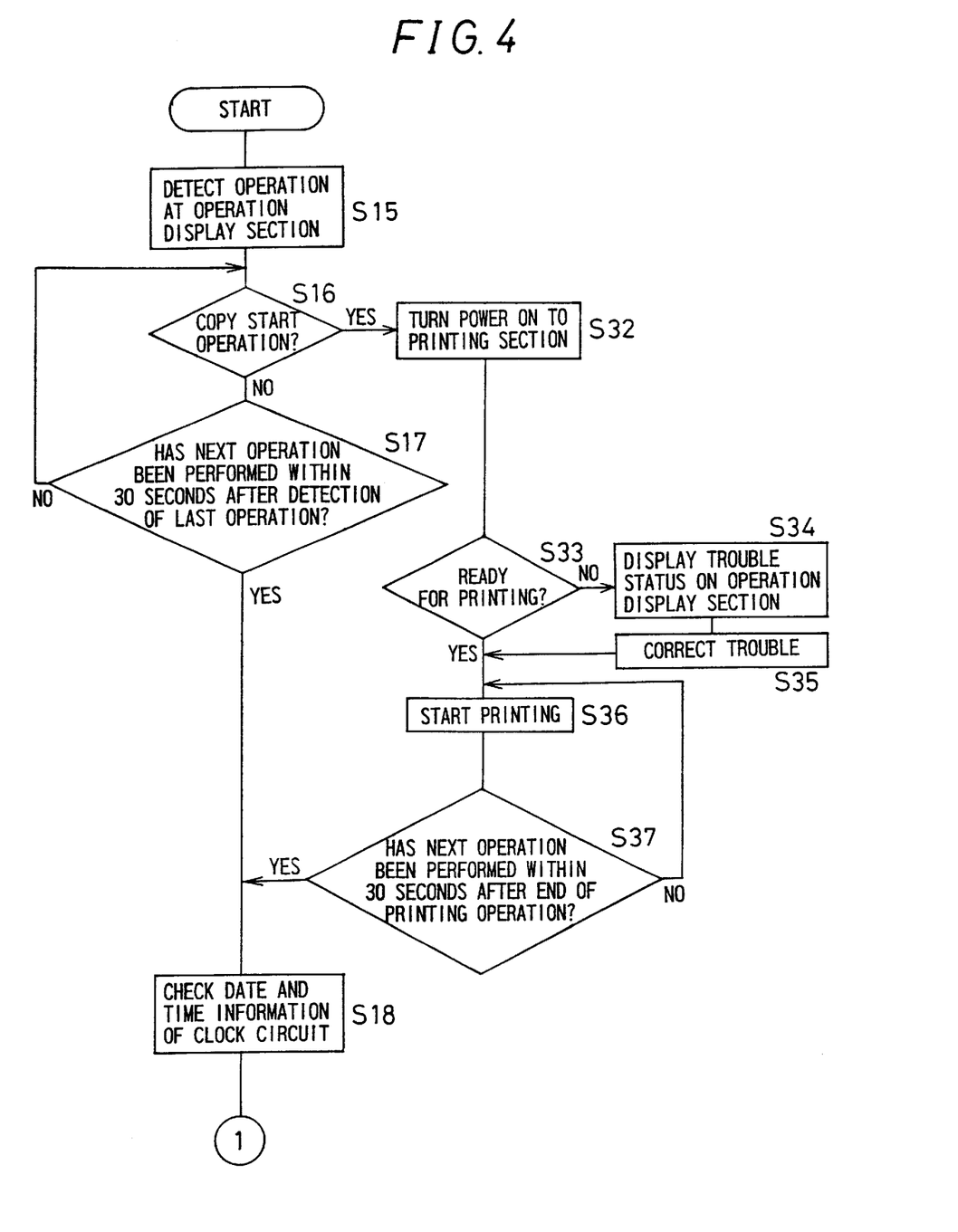
FIG. 4 is a flow chart for explaining how processing is performed in response to an operation performed at an operation display section in the information communication apparatus of the first embodiment of the invention.
Figure 5:
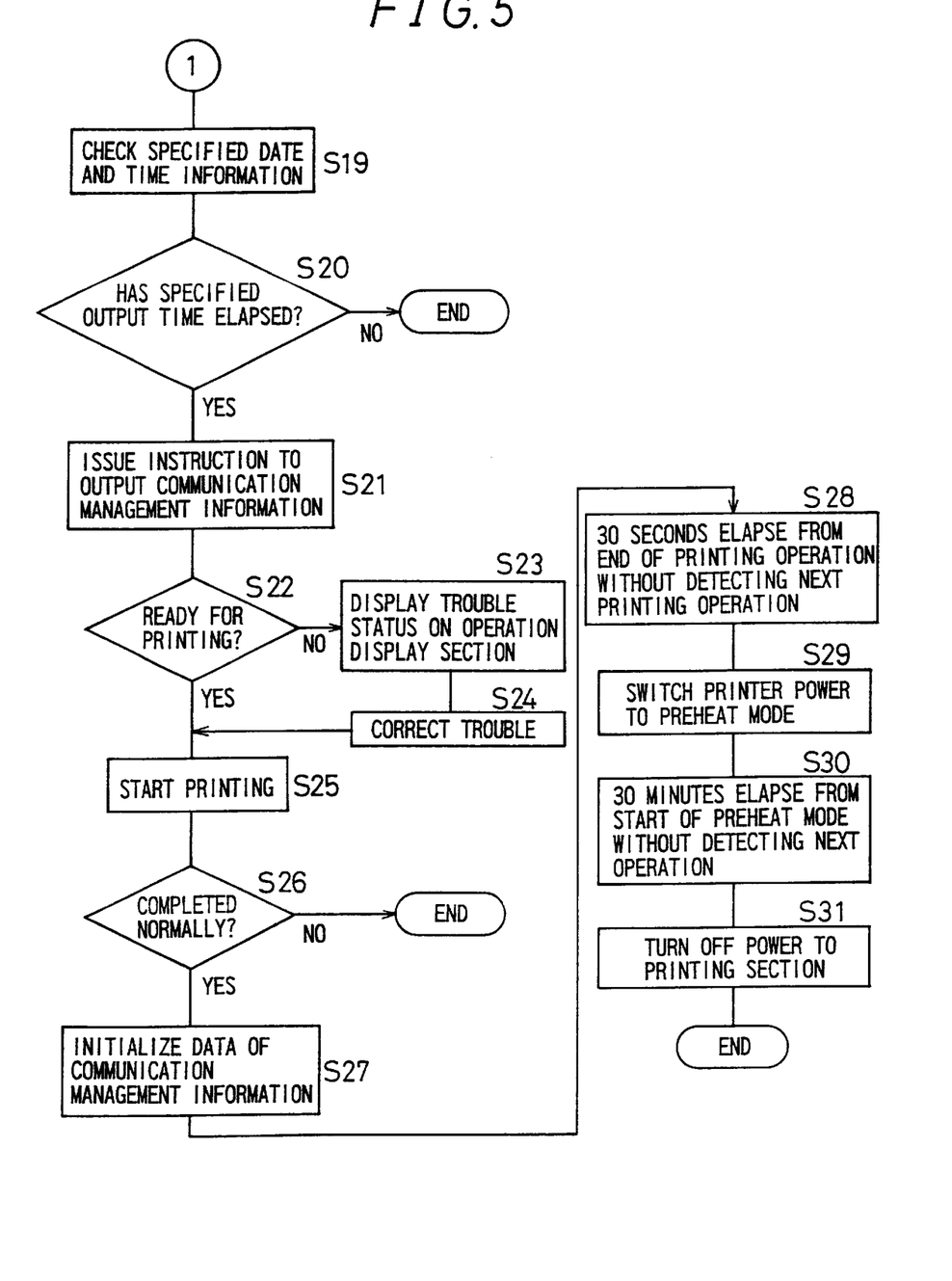
FIG. 5 is a flow chart for explaining how processing is performed in response to an operation performed at the operation display section in the information communication apparatus of the first embodiment of the invention.

Referring now to FIGS. 4 and 5, a description will be given of how processing is performed in response to an operation performed at the operation display section 4 in the transmitting/receiving apparatus 10 of the first embodiment of the invention. The flow charts shown in FIGS. 4 and 5 are largely divided into two processes, i.e., the process when the operation performed at the operation display section 4 is not one that directs the initiation of a copy operation, and the process when the operation performed at the operation display section 4 is one that directs the initiation of a copy operation. The following description deals with each process separately.

(1) The process when the operation performed at the operation display section is not one that directs the initiation of a copy operation When the operation performed at the operation display section 4 by an operator is detected (S15), the transmission/reception control section 6 judges whether or not the operation performed at the operation display section 4 is one that directs the initiation of a copy operation (S16); in this case, if the operation performed at the operation display section 4 is judged as being an operation other than the operation that directs the initiation of a copy operation (N in S16), the transmission/reception control section 6 instructs the clock circuit 13 to start counting, for example, 30 seconds, and monitors the operation display section 4 to detect whether the next operation is performed there within that time (S17); if the next operation is detected (N(Y?) in S17), the counting of 30 seconds by the clock circuit 13 is reset, and the process returns to step S16. In this way, in steps S16 and S17, it is determined whether 30 seconds have passed or not since the last operation to the operation display section 4 was performed.

The time to count here can be preset by entering the desired time to the clock circuit 13 from the numeric key pad, etc. using key switches or a touch panel while checking the display on the operation display section 4, or by storing the desired time in a designated area of the system memory.

A description will be given of how the operation of the operation display section 4 is detected; when a certain key on the operation display section 4 is operated, for example, a key signal is outputted onto the system bus 12 via an output of a key matrix circuit or a serial communication output, and input to an input port of the CPU via a key strobe circuit or an expansion I/O circuit or the like in the transmission/reception control section 6, so that the CPU can recognize the key operation by scanning the port.

Turning back to the flow chart, if it is detected that the operation display section 4 has not been operated for more than 30 seconds since the operator last operated it (Y(N?) in S17), by referring to the clock circuit 13 the transmission/reception control section 6 checks the date and time at which the last operation was detected (S18), and also checks the date or the time specified to output the communication management information stored in the system memory (S19).

When specifying the output date or time of the communication management information, since the frequency of use of the transmitting/receiving apparatus 10 varies from one operator to another, provisions may be made to set a desired interval using the numeric key pad, etc. while checking the display on the operation display section 4 and to store it in the system memory 3 so that the communication management information is outputted at predetermined intervals of time, for example, on the specified day of the week or the specified day of the month.

The transmission/reception control section 6 compares the operation time, which is defined by the date and time at which the operation performed by the operator was detected by the clock circuit 13, with the output time, which is defined by the date or the time specified to output the communication management information stored in the system memory 3, and judges whether the operation has been performed after the specified output time (S20).

If the operation has been performed before the specified output time (N in S20), the communication management information is not outputted; on the other hand, if it is detected that the operation has been performed after the specified output time (Y in S20), an instruction to output the communication management information is issued.

While issuing the instruction to output the communication management information, the transmission/reception control section 6 judges whether the printing section 8 is ready for printing (S22) and, if a trouble, such as a transfer member jam or no transfer member, is detected (N in S22), produces a trouble indication on the operation display section 14 (S23).

When the trouble is corrected by replenishing the transfer member or by removing the jammed transfer member (S24), then the printing section 8 is detected being ready for printing, whereupon the transmission/reception control section 6 reads the communication management information from the system memory 3, has the pattern generator 5 convert character code into a pattern, and supplies the pattern via the line buffer memory 7 to the printing section 8 which then prints the communication management information on the transfer member (S25).

When it is confirmed that the various sensors of the printing section 8 show no fault detection and indicate a normal completion of printing (S26), the transmission/reception control section 6 stores information concerning the output date and time of the communication management information into the system memory 3, while erasing the already printed communication management information stored in the system memory 3 (S27). If the system memory has a sufficient memory capacity, provisions may be made to print out the information stored after the previously output communication management information and to store the printout date and time after printing out the information.

When the transmission/reception control section 6 has detected using the clock circuit 13 that 30 seconds have passed with no printing operation performed since the end of the last printing operation (S28), an instruction is issued to switch to a preheat mode in which the power consumption of the printing section 8 is reduced below the level necessary for printing (S29), and when it is detected using the clock circuit 13 that 30 minutes have elapsed from the start of the preheat mode (S30), the switching instruction is issued again, this time to turn off the power to the printing section 8 (S31).

The time to wait for the next operation, the time to switch to the preheat mode after the end of the printing operation, and the time to switch from the preheat mode to the power off mode may be preset to fixed values by a program or the like within the apparatus, but it is preferable to make provisions so that these times can be varied as desired according to the installation environment, the apparatus specification, or the user's request. To accomplish this, provisions should be made so that the setting of these times can be made by entering desired values from the numeric key pad, etc. while checking the display on the operation display section 4.

(2) The process when the operation performed at the operation display section is one that directs the initiation of a copy operation When the operation performed at the operation display section 4 by an operator is detected (S15), the transmission/reception control section 6 judges whether or not the operation performed at the operation display section 4 is one that directs the initiation of a copy operation (S16); in this case, if the operation performed at the operation display section 4 is judged as being the operation that directs the initiation of a copy operation (Y in S16), then if the printing section 8 is in the power off mode or in the preheat mode in which the power consumption is lower than the level necessary for printing, the transmission/reception control section 6 sends a switching signal to the printing section 8 to turn on the power (S32).

Next, it is checked whether the printing section 8 is ready for printing (S33); if the printing operation cannot be performed due to a trouble such as a transfer member jam or no transfer member (N in S33), a trouble status is displayed on the operation display section 4 (S34), and when the trouble is corrected (S35), the printing operation is started (S36).

When it is detected that the printing operation has been completed, the transmission/reception control section 6 instructs the clock circuit 13 to start counting, for example, 30 seconds, and each time the start of the next printing operation is detected within the 30 seconds, the counting of 30 seconds by the clock circuit 13 is reset, and the process returns from step S37 back to step S36.

Next, when it is detected that no copy operation has been performed for 30 seconds since the end of the last copy operation of the printing section 8 performed by the copy operation start instruction entered by the operator (Y in S37), by referring to the clock circuit 13 the transmission/reception control section 6 checks the date and time at which the last operation was detected (S18), and also checks the date or the time specified to output the communication management information stored in the system memory (Sl9).

The transmission/reception control section 6 compares the operation time, which is defined by the date and time at which the operation performed by the operator was detected by the clock circuit 13, with the output time, which is defined by the date or the time specified to output the communication management information stored in the system memory 3, and judges whether the operation has been performed after the specified output time (S20).

If the operation has been performed before the specified output time (N in S20), the communication management information is not outputted; on the other hand, if it is detected that the operation has been performed after the specified output time (Y in S20), an instruction to output the communication management information is issued (S21).

While issuing the instruction to output the communication management information, the transmission/reception control section 6 judges whether the printing section 8 is ready for printing (S22) and, if a trouble, such as a transfer member jam or no transfer member, is detected (N in S22), produces a trouble indication on the operation display section 14 (S23).

When the trouble is corrected by replenishing the transfer member or by removing the jammed transfer member (S24), then the printing section 8 is detected being ready for printing, whereupon the transmission/reception control section 6 reads the communication management information from the system memory 3, has the pattern generator 5 convert character code into a pattern, and supplies the pattern via the line buffer memory 7 to the printing section 8 which then prints the communication management information on the transfer member (S25).

When it is confirmed that the various sensors of the printing section 8 show no fault detection and indicate a normal completion of printing (S26), the transmission/reception control section 6 stores information concerning the output date and time of the communication management information into the system memory 3, while erasing the already printed communication management information stored in the system memory 3 (S27).

When the transmission/reception control section 6 has detected using the clock circuit 13 that 30 seconds have passed with no printing operation performed since the end of the last printing operation (S28), an instruction is issued to switch to the preheat mode in which the power consumption of the printing section 8 is reduced below the level necessary for printing (S29), and when it is detected using the clock circuit 13 that 30 minutes have elapsed from the start of the preheat mode (S30), the switching instruction is issued again, this time to turn off the power to the printing section 8 (S31).

Next, a description will be give of a transmitting/receiving apparatus 10 as an information communication apparatus of a second embodiment of the invention. The general configuration and the transmitting and receiving operations of the transmitting/receiving apparatus 10 of the second embodiment are equivalent to those of the transmitting/receiving apparatus 10 of the first embodiment, and the description of them will not be repeated here.

Figure 6:
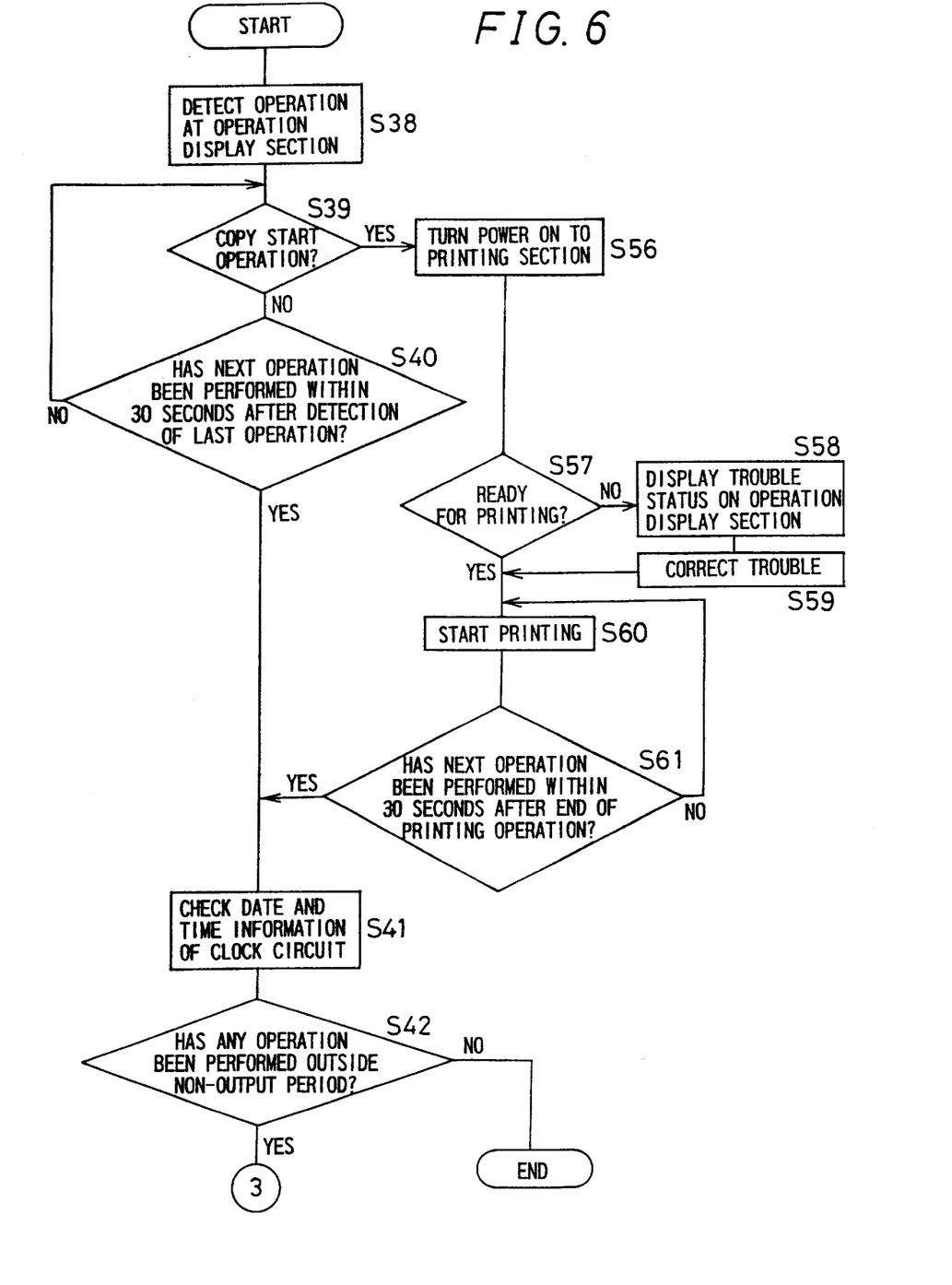
FIG. 6 is a flow chart for explaining how processing is performed in response to an operation performed at the operation display section in the information communication apparatus of a second embodiment of the invention.
Figure 7:
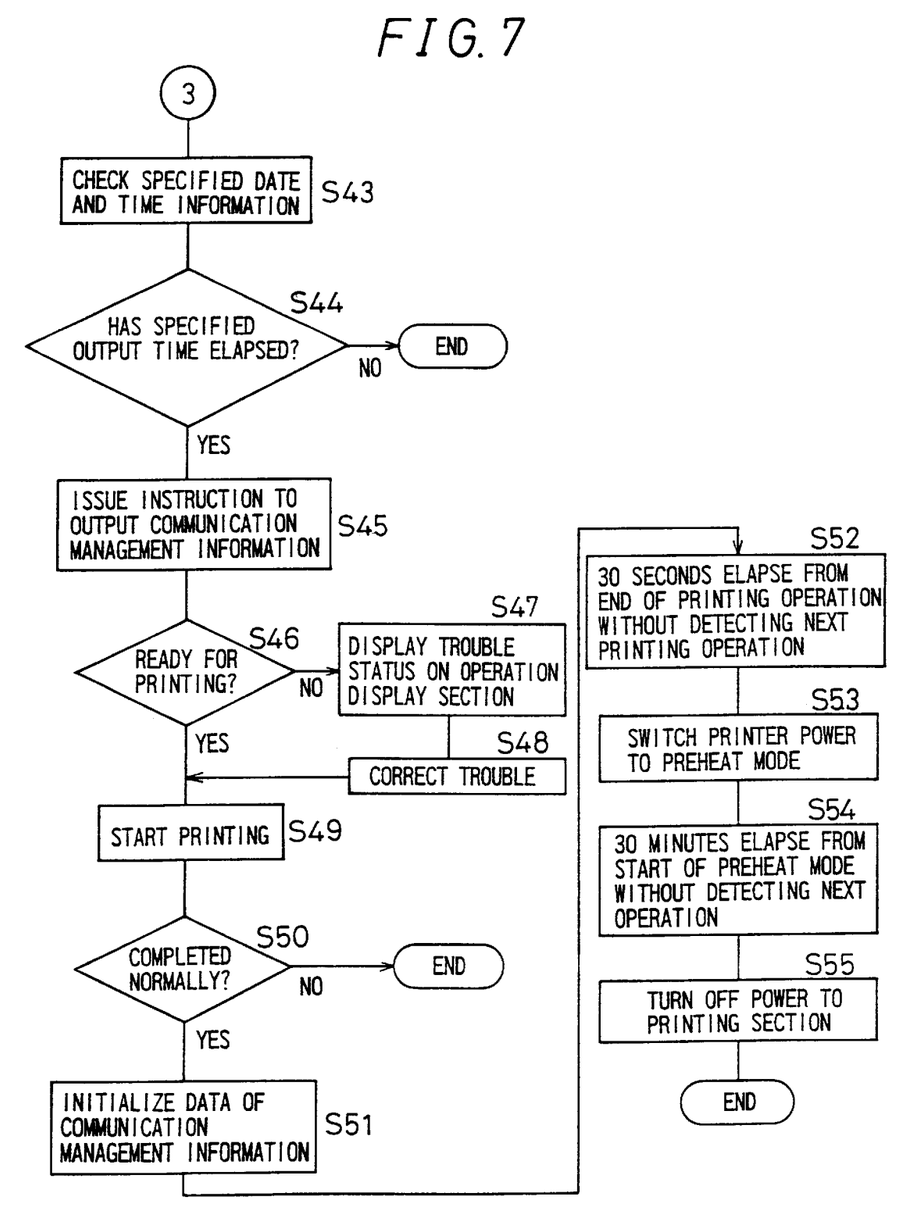
FIG. 7 is a flow chart for explaining how processing is performed in response to an operation performed at the operation display section in the information communication apparatus of the second embodiment of the invention.

Referring to FIGS. 6 and 7, a description will be given of how processing is performed in response to an operation performed at the operation display section 4 in the transmitting/receiving apparatus 10 of the second embodiment of the invention. The flow charts shown in FIGS. 6 and 7 are largely divided into two processes, i.e., the process when the operation performed at the operation display section 4 is not one that directs the initiation of a copy operation, and the process when the operation performed at the operation display section 4 is one that directs the initiation of a copy operation. The following description deals with each process separately.

(1) The process when the operation performed at the operation display section is not one that directs the initiation of a copy operation When the operation performed at the operation display section 4 by an operator is detected (S38), the transmission/reception control section 6 judges whether or not the operation performed at the operation display section 4 is one that directs the initiation of a copy operation (S39); in this case, if the operation performed at the operation display section 4 is judged as being an operation other than the operation that directs the initiation of a copy operation (N in S39), the transmission/reception control section 6 instructs the clock circuit 13 to start counting, for example, 30 seconds, and monitors the operation display section 4 to detect whether the next operation is performed there within that time (S40); if the next operation is detected (N(Y?) in S40), the counting of 30 seconds by the clock circuit 13 is reset, and the process returns to step S39. In this way, in steps S39 and S40, it is determined whether 30 seconds have passed or not since the last operation to the operation display section 4 was performed.

The time to count here can be preset by entering the desired time to the clock circuit 13 from the numeric key pad, etc. using key switches or a touch panel while checking the display on the operation display section 4, or by storing the desired time in a designated area of the system memory.

Next, if it is detected that the operation display section 4 has not been operated for more than 30 seconds since the operator last operated it (Y(N?) in S40), by referring to the clock circuit 13 the transmission/reception control section 6 checks the date and time at which the last operation was detected (S41), and determines whether the operation has been performed outside a non-output period (printout prohibited period) starting, for example, at twelve midnight and lasting until six in the morning, during which the printout of the communication management information stored in the system memory 3 is prohibited (S42). The non-output period during which the output of the communication management information is prohibited may be fixedly stored within the apparatus, but preferably, it is desirable that the non-output period be specified by entering the desired value from the numeric key pad, etc. while checking the display on the operation display section 4 and be stored in the system memory 3 or the like.

Only when the operation performed was detected being outside the non-output period (Y in S42), does the transmission/reception control section 6 check the date or the time specified to output the communication management information stored in the system memory (S43). On the other hand, if the operation performed was detected being inside the non-detection period (N in S42), the processing flow of FIGS. 6 and 7 is terminated.

When specifying the output date or time of the communication management information, since the frequency of use of the transmitting/receiving apparatus 10 varies from one operator to another, provisions may be made to set a desired interval using the numeric key pad, etc. while checking the display on the operation display section 4 and to store it in the system memory 3 so that the communication management information is outputted at predetermined intervals of time, for example, on the specified day of the week or the specified day of the month.

The transmission/reception control section 6 compares the operation time, which is defined by the date and time at which the operation performed by the operator was detected by the clock circuit 13, with the output time, which is defined by the date or the time specified to output the communication management information stored in the system memory 3, and judges whether the operation has been performed after the specified output time (S44).

If the operation has been performed before the specified output time (N in S44), the communication management information is not outputted; on the other hand, if it is detected that the operation has been performed after the specified output time (Y in S44), an instruction to output the communication management information is issued.

While issuing the instruction to output the communication management information, the transmission/reception control section 6 judges whether the printing section 8 is ready for printing (S46) and, if a trouble, such as a transfer member jam or no transfer member, is detected (N in S46), produces a trouble indication on the operation display section 14 (S47).

When the trouble is corrected by replenishing the transfer member or by removing the jammed transfer member (S48), then the printing section 8 is detected being ready for printing, whereupon the transmission/reception control section 6 reads the communication management information from the system memory 3, has the pattern generator 5 convert character code into a pattern, and supplies the pattern via the line buffer memory 7 to the printing section 8 which then prints the communication management information on the transfer member (S49).

When it is confirmed that the various sensors of the printing section 8 show no fault detection and indicate a normal completion of printing (S50), the transmission/reception control section 6 stores information concerning the output date and time of the communication management information into the system memory 3, while erasing the already printed communication management information stored in the system memory 3 (S51). If the system memory has a sufficient memory capacity, provisions may be made to print out the information stored after the previously outputted communication management information and to store the printout date and time after printing out the information.

When the transmission/reception control section 6 has detected using the clock circuit 13 that 30 seconds have passed with no printing operation performed since the end of the last printing operation (S52), an instruction is issued to switch to the preheat mode in which the power consumption of the printing section 8 is reduced below the level necessary for printing (S53), and when it is detected using the clock circuit 13 that 30 minutes have elapsed from the start of the preheat mode (S54), the switching instruction is issued again, this time to turn off the power to the printing section 8 (S55).

The time to wait for the next operation, the time to switch to the preheat mode after the end of the printing operation, and the time to switch from the preheat mode to the power off mode may be preset to fixed values by a program or the like within the apparatus, but it is preferable to make provisions so that these times can be varied as desired according to the installation environment, the apparatus specification, or the user's request. To accomplish this, provisions should be made so that the setting of these times can be made by entering desired values from the numeric key pad, etc. while checking the display on the operation display section 4.

(2) The process when the operation performed at the operation display section is one that directs the initiation of a copy operation When the operation performed at the operation display section 4 by an operator is detected (S38), the transmission/reception control section 6 judges whether or not the operation performed at the operation display section 4 is one that directs the initiation of a copy operation (S39); in this case, if the operation performed at the operation display section 4 is judged as being the operation that directs the initiation of a copy operation (Y in S39), then if the printing section 8 is in the power off mode or in the preheat mode in which the power consumption is lower than the level necessary for printing, the transmission/reception control section 6 sends a switching signal to the printing section 8 to turn on the power (S56).

Next, it is checked whether the printing section 8 is ready for printing (S57); if the printing operation cannot be performed due to a trouble such as a transfer member jam or no transfer member (N in S57), a trouble status is displayed on the operation display section 4 (S58), and when the trouble is corrected (S59), the printing operation is started (S60).

When it is detected that the printing operation has been completed, the transmission/reception control section 6 instructs the clock circuit 13 to start counting, for example, 30 seconds, and each time the start of the next printing operation is detected, the counting of 30 seconds by the clock circuit 13 is reset.

Next, when it is detected that no copy operation has been performed for 30 seconds since the end of the last copy operation of the printing section 8 performed by the copy operation start instruction entered by the operator (Y in S61), by referring to the clock circuit 13 the transmission/reception control section 6 checks the date and time at which the last operation was detected (S41), and at the same time, determines whether the operation has been performed outside the non-output period starting at twelve midnight and lasting until six in the morning, during which the printout of the communication management information stored in the system memory 3 is prohibited (S42). If the operation performed falls within the non-detection period (N in S42), the processing flow of FIGS. 6 and 7 is terminated.

On the other hand, if the operation performed was detected being outside the non-output period, the transmission/reception control section 6 also checks the date or the time specified to output the communication management information stored in the system memory 3 (S43).

The transmission/reception control section 6 compares the operation time, which is defined by the date and time at which the operation performed by the operator was detected by the clock circuit 13, with the output time, which is defined by the date or the time specified to output the communication management information stored in the system memory 3, and judges whether the operation has been performed after the specified output time (S44).

If the operation has been performed before the specified output time (N in S44), the communication management information is not outputted; on the other hand, if it is detected that the operation has been performed after the specified output time (Y in S44), an instruction to output the communication management information is issued (S45).

While issuing the instruction to output the communication management information, the transmission/reception control section 6 judges whether the printing section 8 is ready for printing (S46) and, if a trouble, such as a transfer member jam or no transfer member, is detected (N in S46), produces a trouble indication on the operation display section 14 (S47).

When the trouble is corrected by replenishing the transfer member or by removing the jammed transfer member (S48), then the printing section 8 is detected being ready for printing, whereupon the transmission/reception control section 6 reads the communication management information from the system memory 3, has the pattern generator 5 convert character code into a pattern, and supplies the pattern via the line buffer memory 7 to the printing section 8 which then prints the communication management information on the transfer member (S49).

When it is confirmed that the various sensors of the printing section 8 show no fault detection and indicate a normal completion of printing (S50), the transmission/reception control section 6 stores information concerning the output date and time of the communication management information into the system memory 3, while erasing the already printed communication management information stored in the system memory 3 (S51).

When the transmission/reception control section 6 has detected using the clock circuit 13 that 30 seconds have passed with no printing operation performed since the end of the last printing operation (S52), an instruction is issued to switch to the preheat mode in which the power consumption of the printing section 8 is reduced below the level necessary for printing (S53), and when it is detected using the clock circuit 13 that 30 minutes have elapsed from the start of the preheat mode (S54), the switching instruction is issued again, this time to turn off the power to the printing section 8 (S55).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An information communication apparatus comprising:
    operating means for operating the apparatus;
    communication means capable of communicating information mutually with a remote apparatus via a communication line;
    storage means for storing communication management information for managing a communication history as communication history information, and printout time information which is preset with respect to printout of the communication management information;
    printing means for printing out received information and the communication management information; and
    clock means for detecting time information concerning a time at which information was transmitted or received and a time at which the communication management information was printed out,
    wherein the communication management information is updated every time when information is transmitted/received, and is allowed to be printed out via the printing means based on the printout time information, the information communication apparatus further comprising:
    operation detecting means for detecting that an operation has been performed at the operating means; and
    control means for comparing, in the case where it is detected by the operation detecting means that an operation has been performed at the operating means, an operation time at which the operation at the operating means was detected by the operation detecting means with the printout time information and, in the case where the operation time is later than a time defined by the printout time information, controlling the printing means to print out the communication management information.

2. The information communication apparatus of claim 1, wherein the storage means further stores a printout prohibited period which is preset as a period during which the communication management information is prohibited from being printed out, and
    the control means further judges whether the operation time falls within the printout prohibited period, and in the case where the operation time is outside the printout prohibited period and is later than the time defined by the printout time information, controls the printing means to print out the communication management information.

3. The information communication apparatus of claim 1, wherein the storage means further stores a previous operation time representing a time at which the operating means was last operated and an operation interval of time which is preset with respect to allowance of printout, and
    the control means further controls the printing means to print out the communication management information in the case where a period of time which elapsed between the previous operation time and an operation time currently detected exceeds the operation interval of time.

4. An information communication apparatus comprising:
    communication means capable of communicating information mutually with a remote apparatus via a communication line;
    storage means for storing communication management information for managing a communication history as communication history information, and printout time information which is preset with respect to printout of the communication management information;
    printing means for printing out received information and the communication management information; and
    clock means for detecting time information concerning a time at which information was transmitted or received and a time at which the communication management information was printed out,
    the communication management information being updated every time when information is transmitted/received, and being allowed to be printed out via the printing means based on the printout time information,
    wherein the clock means detects time information concerning a printout completion time at which the printing means has completed the printout, and
    the storage means stores the printout completion time based on a result of the detection from the clock means and a printout allowed interval of time which is preset as an interval of time during which the communication management information is allowed to be printed out,
    the information communication apparatus further comprising:
    control means for controlling, when it is confirmed that no printing operation has been carried out during the printout allowed interval of time which has elapsed from the printout completion time, the printing means to print out the communication management information.

* * * * *